United States Patent
Lopez-Perez et al.

(10) Patent No.: US 10,149,305 B2
(45) Date of Patent: Dec. 4, 2018

(54) MITIGATING UL-TO-DL INTERFERENCE

(71) Applicant: Alcatel Lucent, Boulogne Billancourt (FR)

(72) Inventors: David Lopez-Perez, Blanchardstown (IE); Holger Claussen, Blanchardstown (IE)

(73) Assignee: Alcatel Lucent, Boulogne Billancourt (FR)

( * ) Notice: Subject to any disclaimer, the term of this patent is extended or adjusted under 35 U.S.C. 154(b) by 82 days.

(21) Appl. No.: 15/302,649

(22) PCT Filed: Mar. 11, 2015

(86) PCT No.: PCT/EP2015/055086
§ 371 (c)(1),
(2) Date: Oct. 7, 2016

(87) PCT Pub. No.: WO2015/154935
PCT Pub. Date: Oct. 15, 2015

(65) Prior Publication Data
US 2017/0034837 A1 Feb. 2, 2017

(30) Foreign Application Priority Data
Apr. 7, 2014 (EP) .................................. 14290098

(51) Int. Cl.
*H04W 72/08* (2009.01)
*H04W 72/12* (2009.01)
(Continued)

(52) U.S. Cl.
CPC ............. *H04W 72/082* (2013.01); *H04L 5/14* (2013.01); *H04W 72/042* (2013.01);
(Continued)

(58) Field of Classification Search
CPC .......... H04W 72/082; H04W 72/0413; H04W 72/042; H04W 72/0453; H04W 72/1231;
(Continued)

(56) References Cited

U.S. PATENT DOCUMENTS

| 2005/0221861 A1 | 10/2005 | Zeira |
| 2013/0003680 A1* | 1/2013 | Yamamoto ............ G01S 5/0205 370/329 |

(Continued)

FOREIGN PATENT DOCUMENTS

| JP | 2007-532059 A | 11/2007 |
| WO | WO 2013/074213 A1 | 5/2013 |
| WO | WO 2013/178037 A1 | 12/2013 |

OTHER PUBLICATIONS

Mahmoud I. Kamel and Khaled M. F. Elsayed ( Performance Evaluation of a Coordinated Time-Domain eICIC Framework based on ABSF in Heterogeneous LTE-Advanced Networks, 2012). (Year:2012).*

(Continued)

*Primary Examiner* — Maharishi V Khirodhar
(74) *Attorney, Agent, or Firm* — Fay Sharpe LLP

(57) ABSTRACT

A method, in a heterogeneous telecommunications network, for mitigating uplink-downlink (UL-DL) interference between a first half-duplex user equipment (UE) operable to communicate using a first frequency resource in an uplink to a first full-duplex node, and a second half duplex UE operable to receive downlink communications from a second full-duplex node, the method including receiving, at the second node, an indication of actual or potential UL-DL interference generated by the first UE, scheduling a pair of UEs, that includes the second UE, for full-duplex UL-DL communication with the second full-duplex node in which DL transmissions to the second UE from the second node use a second frequency resource different from the first (Continued)

frequency resource or in which scheduling is avoided for DL connections to the second UE that fall below a quality of service threshold determined using channel quality measurements obtained by the second UE for the first and second frequency resources.

15 Claims, 4 Drawing Sheets

(51) Int. Cl.
*H04L 5/14* (2006.01)
*H04W 72/04* (2009.01)
*H04W 4/00* (2018.01)
*H04W 84/04* (2009.01)

(52) U.S. Cl.
CPC ... *H04W 72/0413* (2013.01); *H04W 72/0453* (2013.01); *H04W 72/1231* (2013.01); *H04W 72/121* (2013.01); *H04W 72/1278* (2013.01); *H04W 84/045* (2013.01)

(58) Field of Classification Search
CPC ............... H04W 72/1278; H04W 5/14; H04W 84/045; H04L 5/14
See application file for complete search history.

(56) References Cited

U.S. PATENT DOCUMENTS

| | | | |
|---|---|---|---|
| 2014/0269448 A1* | 9/2014 | Aggarwal | H04W 74/085 370/277 |
| 2015/0189666 A1* | 7/2015 | Wang | H04W 72/1226 370/329 |

OTHER PUBLICATIONS

David Lopez Perez ( Enhanced Intercell Interference Coordination Challenges in Heterogeneous Networks, 2011). (Year: 2011).*
Aleksandar Damnjanovic (A Survey on 3GPP Heterogeneous Networks, 2011). (Year: 2011).*
Nazmus (Interference Management in OFDMA Femtocell Networks: Issues and Approaches, 2012). (Year:2012).*
Sungsoo Park (A beamforming codebook restriction for Cross-Tier Interference Coordination in Two-Tier Femtocell Networks, 2011) (Year: 2011).*
International Search Report for PCT/EP2015/055086 dated Jun. 2, 2015.

* cited by examiner

MITIGATING UL-TO-DL INTERFERENCE

TECHNICAL FIELD

The present invention relates, in general, to the field of wireless telecommunications networks, and more specifically, although not exclusively, to full duplex communication within such networks.

BACKGROUND

The useful part of the spectrum for wireless telecommunications is limited and is therefore an expensive commodity that cellular operators have spent large amounts on. As a result, they have a high interest in utilizing the spectrum as efficiently as possible.

There are different approaches that can be used to increase the efficiency of spectrum use. Some examples are small cells, which are low-powered radio access nodes that can be used to offload traffic, multiple-input and multiple-output (MIMO) antennas, and improved data coding and modulation techniques.

Using different frequency bands for transmission and reception was taken as given since the early beginnings of wireless communications, and not questioned much. However, recently, techniques to successfully receive and transmit signals simultaneously in the same frequency bands of operation have been proposed. Frequency resource allocation schemes can enable full-duplex communications in homogeneous macro-cellular networks, but a new type of physical layer interference emerges due to full-duplex communications, that is the inter-link interference between downlink (DL) and uplink (UL) transmissions, which can be an issue in heterogeneous and small cell networks.

SUMMARY

According to an example, there is provided a method, in a heterogeneous telecommunications network, for mitigating uplink-downlink (UL-DL) interference between a first half-duplex user equipment (UE) operable to communicate using a first frequency resource in an uplink to a first full-duplex node, and a second half duplex UE operable to receive downlink communications from a second full-duplex node, the method including receiving, at the second node, an indication of actual or potential UL-DL interference generated by the first UE, scheduling a pair of UEs, that includes the second UE, for full-duplex UL-DL communication with the second full-duplex node in which DL transmissions to the second UE from the second node use a second frequency resource different from the first frequency resource or in which scheduling is avoided for DL connections to the second UE that fall below a quality of service threshold determined using channel quality measurements obtained by the second UE for the first and second frequency resources. An interference indicator message (IIM) can be transmitted from the first node to the second node including an indication of the first frequency resource to be used for uplink communication to the first node by the first UE. Receiving the indication can include receiving data representing a report at the first full-duplex node from the first UE indicating a measure of the pilot power of the second full-duplex node. Receiving the indication can include receiving channel state information from UEs in connectivity with the second node, and using the channel state information to detect UL-DL interference between the first and second UEs. One or more of a set of multiple antenna elements of the first or second UEs can be used to modify a directional transmission profile of the or each UE in order to form an UL transmission beam from the or each UE to its respective serving node. The pair of UEs can be selected by determining the sum of the DL interference between respective ones of UEs in communication with the second node, and selecting a pair of UEs to be scheduled for which the sum of the DL interference is a minimum.

According to an example, there is provided a full-duplex node in a heterogeneous telecommunications network, operable to provide downlink communications to a victim UE forming one of a pair of half-duplex UEs in UL-DL communication with the node, the node operable to receive an indication of UL-DL interference between the victim UE and a proximate aggressor UE in UL communication using a first frequency resource, schedule the pair of UEs for UL-DL communication such that DL transmissions to the victim UE use a second frequency resource different from the first or avoid scheduling DL connections to the victim UE that fall below a quality of service threshold determined using channel quality measurements obtained from the victim UE for the first and second frequency resources. The node can further be operable to receive an interference indicator message (IIM) that includes an indication of a first frequency resource to be used for the UL communication by the aggressor UE. The node can be operable to receive the IIM from a second full-duplex node of the network. The second node can be operable to receive data representing a report indicating a measure of the pilot power of the node from the aggressor UE. The node can be operable to determine the sum of the DL interference between respective ones of UEs in communication with the node, and select a pair of UEs to be scheduled for which the sum of the DL interference is a minimum.

According to an example, there is provided a full-duplex node in a heterogeneous telecommunications network, operable to serve uplink communications of an aggressor half-duplex UE forming one of a pair of half-duplex UEs in UL-DL communication with the node using a first frequency resource, the node operable to provide, to a second full-duplex node, an indication of UL-DL interference between the aggressor UE and a proximate victim UE in DL communication with the second full-duplex node, whereby to enable the second node to schedule a pair of UEs for UL-DL communication with the second node such that DL transmissions to the victim UE use a second frequency resource different from the first or avoid scheduling DL connections to the victim UE that fall below a quality of service threshold determined using channel quality measurements obtained from the victim UE for the first and second frequency resources. The node can be operable to determine the sum of the DL interference between respective ones of UEs in communication with the node, and select a pair of UEs to be scheduled for which the sum of the DL interference is a minimum.

According to an example, there is provided a computer program product, comprising a computer usable medium having computer readable program code embodied therein, said computer readable program code adapted to be executed to implement a method to schedule, in a heterogeneous telecommunications network, DL communication from a victim full-duplex node to a victim UE that is one of a pair of UEs in UL-DL communication with the victim node, the victim UE in proximity to an aggressor UE in UL communication with an aggressor full-duplex node, by receiving an indication of actual or potential UL-DL interference between the victim UE and the aggressor UE at the victim node, scheduling the pair of UEs such that the DL communication to the victim UE use a second frequency resource different from the first or avoiding the scheduling of DL connections to the victim UE that fall below a quality of service threshold determined using channel quality measurements obtained from the victim UE for the first and second frequency resources. The program code embodied thereon to be executed can be used to determine the sum of the DL interference between respective ones of UEs in communication with the node, and select a pair of UEs to be scheduled for which the sum of the DL interference is a minimum.

BRIEF DESCRIPTION OF THE FIGURES

Embodiments will now be described, by way of example only, with reference to the accompanying drawings, in which.

DESCRIPTION

Figure 1:
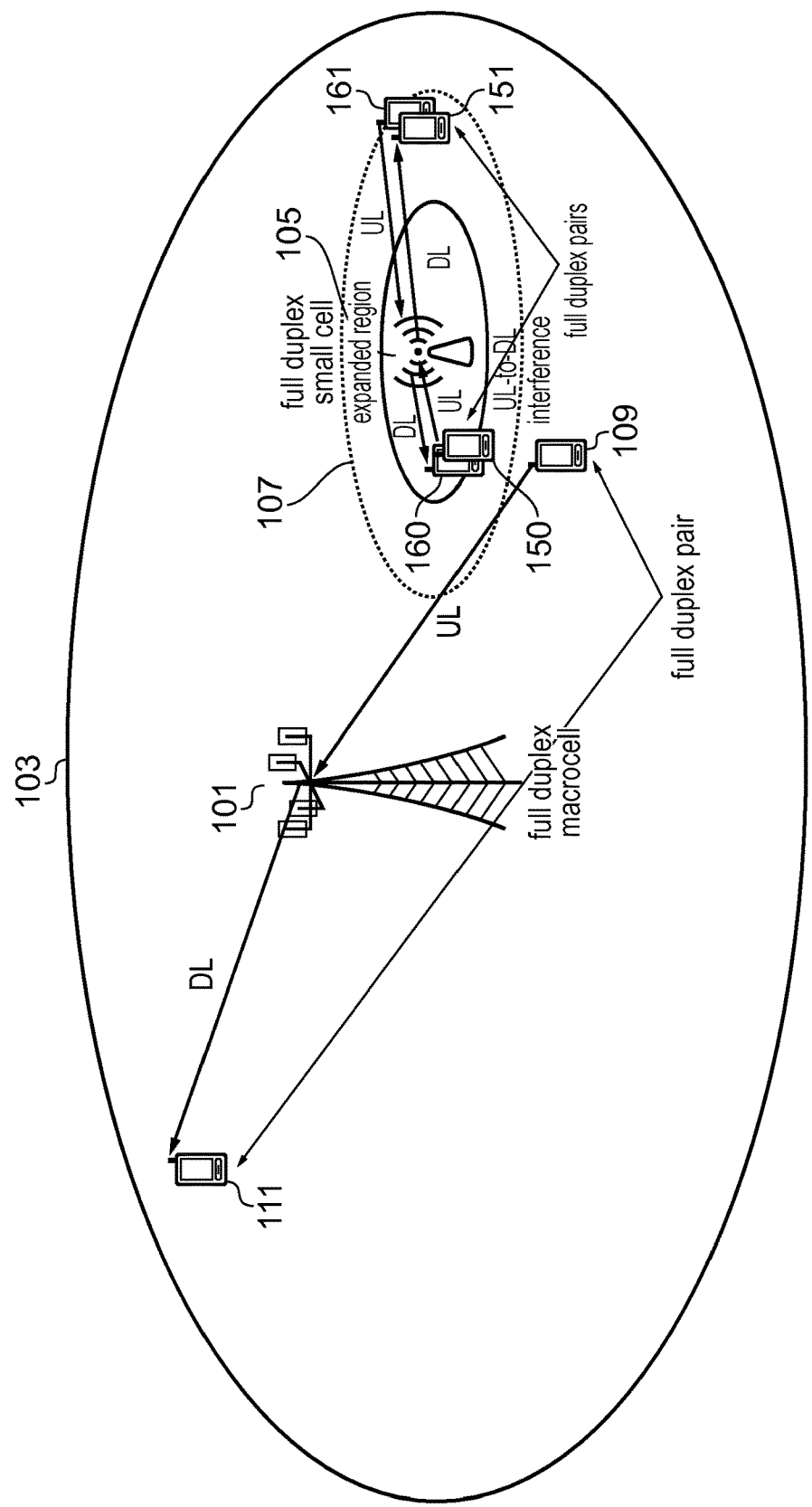
FIG. 1 is a schematic representation of heterogeneous telecommunications network according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Full duplex wireless transmission can potentially double the available frequency spectrum for UE usage and be one additional way for increasing the wireless network capacity. This means that a base station node can transmit and receive using the same frequency bands at the same time. According to an example, a method for re-using frequencies is proposed that allows full duplex communication in a base station node with mobile UEs. The approach enables the full benefits of full duplex communication (up to 2× capacity increase in the same bandwidth) per base station, while retaining backwards compatibility with standard UEs.

Given a set of frequency resources and a set of cells or nodes with the capability of using full-duplex communications over the available set of frequency resources, inter-link interference can be generated by the uplink (UL) of one UE connected to one cell (the aggressor UE/cell) to the downlink (DL) of another UE connected to a different cell (the victim UE/cell). According to an example, such UL-to-DL interference can be mitigated using interference coordination. More particularly, a given node, which can also be referred to as the aggressor base station for example, scheduling a cell-edge UE (referred to as the aggressor UE) with high power in the UL, and with this UE being proximate to or in the vicinity of one or more neighboring nodes (referred to as the victim cells), can transmit or provide a high interference indicator message (IIM) to such potential victim cell nodes indicating that they should refrain from scheduling DL transmissions to UEs that are in the vicinity of the aggressor UE since they may suffer from strong UL-to-DL interference. In an example, such IIM message can indicate the frequency resources to be used by the aggressing UL and the timeframe.

If the neighboring cell node can serve its respective UEs that are in the vicinity of the aggressor UE in the DL without making use of the frequency resources specified in the IIM message, then UL-to-DL interference can be successfully mitigated through simple scheduling decisions.

Otherwise, each victim node can instruct its UEs to take channel quality information measurements on the frequency resources indicated in the IIM message, and then create and schedule full-duplex UE pairs in a way that DL connections which do not meet a given quality of service are never scheduled around the aggressing UL. To enable full-duplex communication in wireless networks with mobile legacy UEs, a node can transmit in full-duplex mode to two UEs at the same time and frequency resource where each UE only needs to operate in traditional but complementing half-duplex mode.

In an example, this can be performed by minimizing the sum of the DL interference when building the full-duplex UE pairs and allocating them frequency resources. In this way, reliable interference mitigation can be carried out at the victim node that has received the IIM message.

Figure 2:
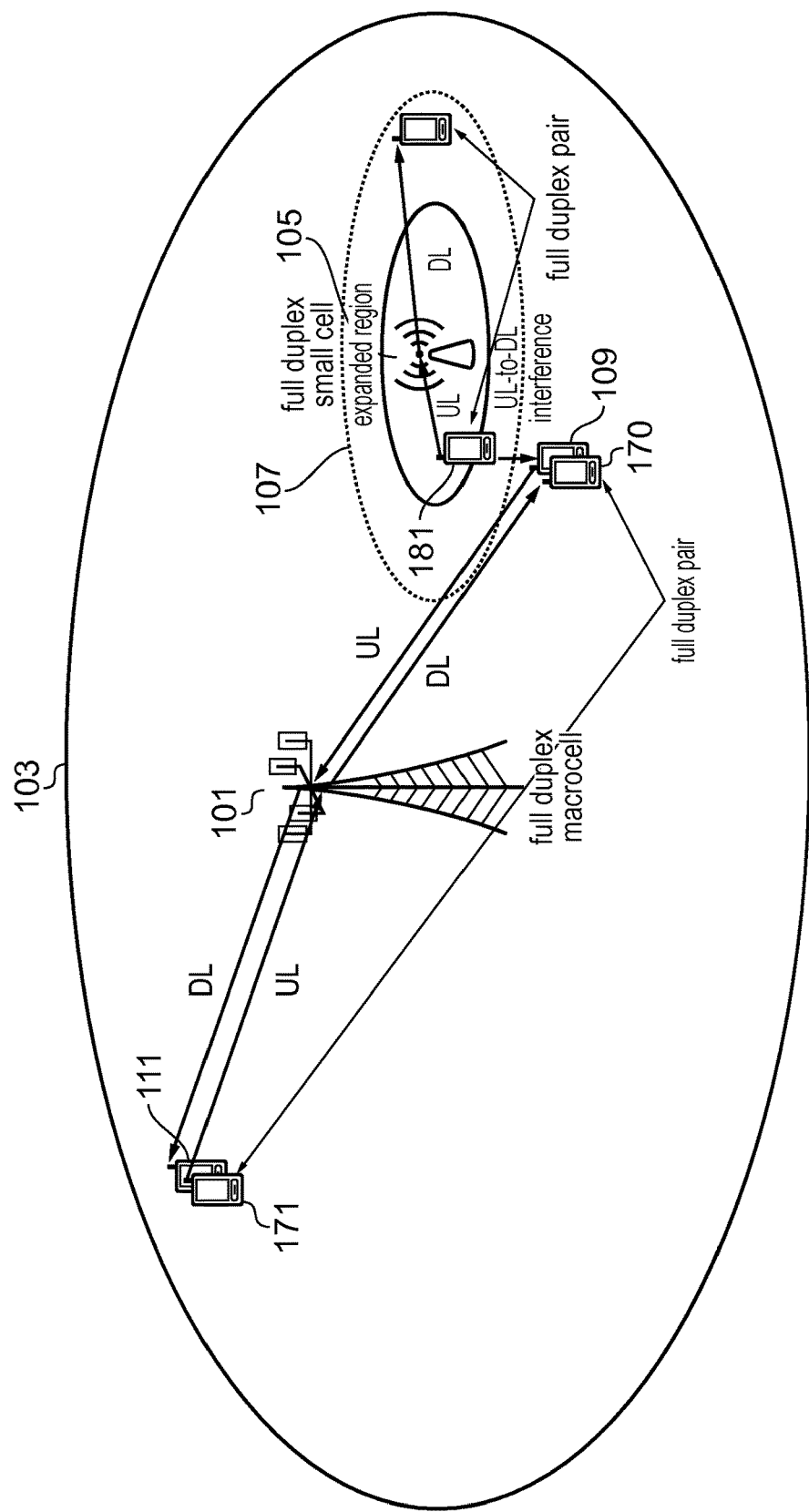
FIG. 2 is a further schematic representation of heterogeneous telecommunications network according to an example.

FIG. 1 is a schematic representation of a heterogeneous telecommunications network according to an example. FIG. 2 is a schematic representation of a heterogeneous telecommunications network according to an example. In FIG. 1, a full-duplex node such as a base station node for a macro cell of the network provides telecommunications coverage to UE devices within the coverage area depicted by cell 103. A small cell full-duplex node 105 provides telecommunications coverage to UE devices within the coverage area depicted by 107, which can include a range expanded region. UE 109 forms one UE of a pair of half-duplex UEs in full-duplex communication with node 101, UE 111 forms the other UE of the pair of half-duplex UEs in full-duplex communication with node 101. UE 109 and UE 111 transmit in the same frequency resource, the former in UL and the latter in DL. This is the same as depicted in FIG. 2. The figures illustrate the UL-macro-cell to DL-small-cell and UL-small-cell to DL-macro-cell interference mitigation phenomena in full-duplex heterogeneous networks, respectively. As illustrated in these figures, in the scheduling procedure, it is not only important to decide which UEs are allocated in each frequency resource but also in which direction they transmit, DL or UL, and this is different to traditional scheduling procedures.

For example, with reference to FIG. 1, the full-duplex UE pair 150, 151 will suffer less interference than the full-duplex UE pair 160, 161 due to the formation of the UE transmission pairing in view of the nearby, neighbouring, adjacent or proximate device 109 transmitting high power in the UL with node 101. With reference to FIG. 2, the UE pair 109, 111 will suffer less interference than the UE pair 170, 171 due to the formation of the UE transmission pairing in view of the proximate device 181 transmitting in the UL with node 105.

According to an example, a connection between the aggressing and victim cells can be utilized in order to exchange IIM messages. However, such a connection does not need to be a high capacity one since scheduling information or data to be transmitted do not need to be exchanged between nodes as in the interference cancellation case, only IIM messages.

Alternatively, if such a connection does not exist, the victim cell can detect UL-to-DL interference through its UE channel state information feedback and can then perform the scheduling of its full-duplex UE pairs accordingly so that such interference is mitigated. Such interference coordination procedures help to realize the full benefits of full-duplex communications at the system level in heterogeneous and small cell networks (such as with two or more UEs per cell, which is the case in macro-cellular networks), thereby providing up to 2×capacity increase.

Backwards compatibility with existing UEs is catered for since standard transceivers can be used at the UE. In an example, a more advanced transceiver can be used at the base station node that can cancel the self-interference of the transmit signal from the receive path.

Full-duplex wireless transmission can potentially double the available frequency spectrum for UE usage and be one additional way for increasing the wireless network capacity. This means that a node can transmit and receive using the same frequency bands at the same time. As noted above, to enable full-duplex communication in wireless networks with mobile legacy UEs, a node can transmit in full-duplex mode to two UEs at the same time and frequency resource where each UE only needs to operate in traditional but complementing half-duplex mode. This enables the doubling of the available bandwidth in both the DL and the UL, but creates new inter-link interference between nodes and between UEs.

According to an example, to mitigate UL-to-DL interference, an interference mitigation method based on interference coordination, where UL-to-DL is mitigated via scheduling decisions in which it is decided not only which UEs are allocated to which frequency resources, but also in which direction each UE should transmit.

This contrasts with the typical system in which all UEs and nodes are transmitting and receiving on different time/frequency (i.e. the same half-duplex configuration for all UEs and nodes), and thus there is no inter-link interference (i.e., the UL of a cell never interferes the DL of a neighboring one).

With reference to FIG. 1, a full-duplex macrocell node 101, a full-duplex small cell node 105, and two frequency resources (1 and 2) are available. The full-duplex macrocell node 101 is serving a first full-duplex pair of UEs, one DL UE 111 and one UL UE 109 in a given frequency resource, e.g., frequency resource 1, while the full-duplex small cell node 105 is also willing to serve a second full-duplex pair of UEs. According to an example, the full-duplex nodes 101, 105 follow the following procedure:

When the macrocell node 101 is willing to schedule a cell-edge UE 109 with high power in the UL and this UE reports that it is nearby a small cell node, such as 105, the macrocell node sends an IIM message to the nearby small cell node 105 indicating that it is willing to schedule a full-duplex UE pair in a given frequency resource, e.g., frequency resource 1.

The macrocell node 101 can know that its cell-edge UE 109 to be scheduled in the UL is nearby a small cell node 105, if it reports that:
  the received pilot signal power from the small cell node 105 is larger than a predefined threshold value; or that
  the received pilot signal power from the macrocell node 101 minus the received pilot signal power from the small cell node 105 is smaller than a predefined threshold value.

Received pilot signal power measurements are performed on regular basis for handover purposes and thus are always available.

Once the small cell node 105 receives the IIM message, it is aware that significant UL-to-DL interference may be present in the frequency resources indicated in the message. If the small cell node 105 can serve its UEs in the DL without making use of the frequency resources specified in the IIM message, then UL-to-DL interference can be successfully mitigated through simple scheduling decisions. For example, the small cell node 105 can schedule its full-duplex UE pair in a different frequency resource, resource 2 for example.

However, it may be the case that the macrocell node 101 is willing to schedule its full-duplex UE pair 109, 111 not only in frequency resource 1 but also in frequency resource 2 (and in an example, for such cases both frequency resources are indicated in the IIM message), and thus the small cell node 105 does not have any frequency resource completely free of DL-to-UL interference to schedule a full-duplex UE pair.

In this case, according to an example, the small cell node 105 can instruct its UEs to take and feedback channel quality information measurements on the frequency resources indicated in the IIM message, and then create and schedule its full-duplex UE pairs in a way that DL connections which do not meet a given quality of service are never scheduled around the aggressing UL UE. For example, in FIG. 1, the small cell DL UE 160 on the left hand side of the small cell node 105 will report a low signal quality due to the interference generated by the nearby macrocell UL UE 109, while the small cell DL UE 151 on the right hand side of the small cell node will report a larger signal quality since it has no interferer around. In view of such feedback, the small cell node 105 can schedule the small cell UE on the left hand side in the UL and the small cell UE on the right hand side in the DL, and form the full-duplex UE pair accordingly. In other words, the full-duplex UE pair 150, 151 will be selected instead of the full-duplex UE pair 160, 161.

Scheduling can be performed so that the sum of the DL interference across all full-duplex UE pairs and frequency resources is minimized. By minimizing the sum of the DL interference across all UE pairs, the distance between the UEs of a pair is maximized and thus intra-cell UL-to-DL interference is mitigated. In an example, the optimal allocation can be found through global search or other known optimization methods.

In an alternative example, and because UL-to-DL interference may be difficult to assess due to the lack of known UE pilot signals channels between UEs can be estimated based on UE location. Different approaches can be considered. For example, considering path-loss to the base station node, grouping one UE which is far away (high pathloss to base station node) with a UE which is close-by (low path-loss to base station node) will lead to a large distance between the UEs, resulting in high path-loss and low interference. Angle of arrival can be considered, whereby to select pairs of UEs that are located on opposite sides of the base station node. Both path-loss and angle of arrival can be combined. RF fingerprinting can be used to identify UE locations more accurately, and/or triangulation and/or GPS feedback can be used.

During operation estimates can be refined by measurements. For example, if two UEs are scheduled in a group at the same time, the path loss can be estimated based on the transmit power amount of interference received.

With more advanced UEs that have the capability of using multiple antennas to form beams/cancel one strong interferer, an alternative (or complementary) user grouping scheme can be used in order to maximize interference cancellation efficiency. In an example, each UE can form a beam to the serving base station node, which in turn will reduce interference between UEs if they are grouped intelligently.

Full-duplex UE pairs can then be assigned to frequencies resources according to the proposed minimization of the sum of the interference.

In an example, a UE will not be scheduled in a given direction if the required quality of service cannot be met and that UE will be given as many resources as to meet their quality of service constraints in a proportional fair manner.

With reference to FIG. 2, the full-duplex small cell UE 181 is the aggressor UE in the UL and the aggressing small cell 105 triggers the IIM message. The full-duplex macrocell UE 170 is the victim UE cell in the DL. The method as described above works in both directions.

It may occur that a connection between the macrocell 101 and small cell node 105 is not always available, and thus IIM messages cannot be exchanged between them. In this case, according to an example, a reactive mechanism can be used in which the victim cell detects UL-to-DL interference through its UE channel state information feedback and then performs scheduling of its full-duplex UE pairs accordingly so that such interference is mitigated using the same scheduling method as described above.

Since this works in a reactive manner by detecting UL-to-DL interference through UE channel state information feedback, the overhead related to inter-node connection establishment and transmission of IIM messages can be avoided, which can be of importance to operators since it allows small cell nodes to work independently. However, in order to realize an accurate and on time detection of UL-to-DL interference, UEs may need to feedback channel state information more often to their serving nodes. This is a typical trade-off between having or not having inter-node coordination for scheduling purposes.

The methods described here can be also applied using the same principles to sectorized nodes in order to increase spatial re-use at such nodes. In addition, UEs with multiple antenna elements can also use beam-forming to point their respective UL beams towards intended nodes thereby helping to avoid the creation of UL-to-DL interference to the UEs of neighboring nodes.

Figure 3:
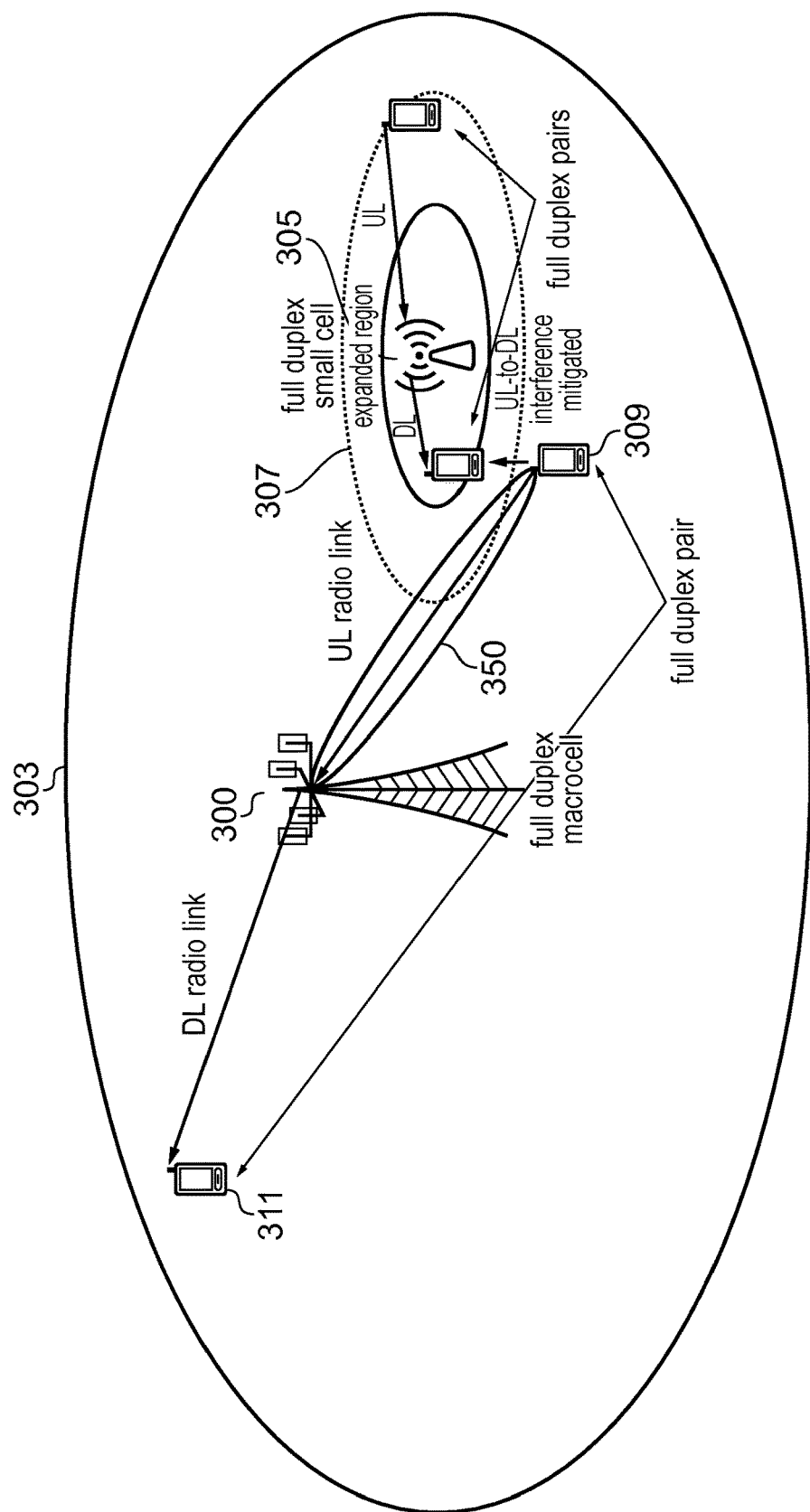
FIG. 3 is a further schematic representation of heterogeneous telecommunications network according to an example.
Figure 4:
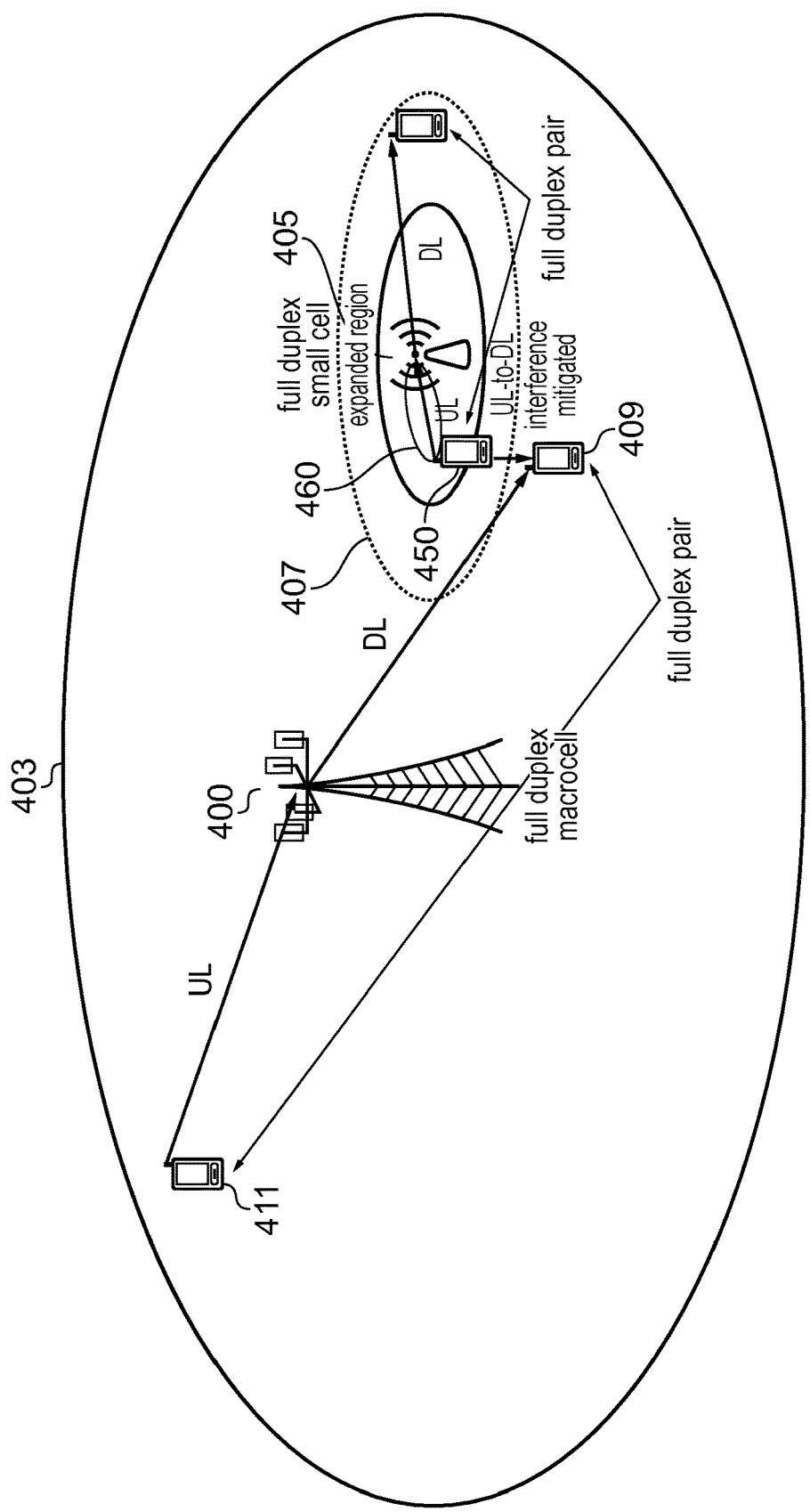
FIG. 4 is a further schematic representation of heterogeneous telecommunications network according to an example.

FIG. 3 is a schematic representation of heterogeneous telecommunications network according to an example. FIG. 4 is a schematic representation of heterogeneous telecommunications network according to an example. Similarly to FIGS. 1 and 2, a full-duplex node such as a base station node 300, 400 for a macro cell of the network provides telecommunications coverage to UE devices within the coverage area depicted by cell 303, 403. A small cell full-duplex node 305, 405 provides telecommunications coverage to UE devices with the coverage area depicted by 307, 407. UE 309, 409 forms one UE of a pair of half-duplex UEs in full-duplex communication with node 300, 400, the other UE of the pair being that depicted by device 311, 411.

UE 309 includes a set of multiple antenna elements that can be used to modify a directional transmission profile of UE in order to form a transmission beam from the UE to its respective serving node 300. For example, a number of the antenna elements can be selected in order to modify an UL transmission profile of the UE so that a beam 350 is effectively formed from UE 309 to node 300. Similarly, with reference to FIG. 3, a UE 450 with a set of multiple antenna elements can be used to modify a directional transmission profile of the UE in order to form a transmission beam from the UE to its respective serving node 405. For example, a number of the antenna elements can be selected in order to modify an UL transmission profile of the UE 450 so that a beam 460 is effectively formed from UE 450 to node 405.

Note that when the DL victim UE is in between the UL aggressing UE (the one doing the beam-forming) and the BS to which this last UE is connected to, interference mitigation via beam-forming will not work and interference coordination will be required. This is because the beam-formed UE antenna lobes, to reach the intended node, will also point towards the victim UE, thus increasing interference.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope. The methods and systems as described herein can be applied using different air interface technology such as for example GSM, LTE and so on, and can be applied to the whole available frequency spectrum or parts of the spectrum.

The invention claimed is:

1. A method, in a heterogeneous telecommunications network, for mitigating uplink-downlink (UL-DL) interference between a first user equipment (UE), which communicates using a first frequency resource in an uplink (UL) to a first node that transmits and receives using shared frequency resources simultaneously so as to provide full-duplex communication, the first UE forming one half of a first pair of UEs, the other UE of the first pair communicating using the first frequency resource in a downlink (DL) with the first node while the first UE communicates in the uplink using the first frequency resource, and a second UE that receives downlink communications from a second node that transmits and receives using shared frequency resources simultaneously so as to provide full-duplex communication, the method including:

receiving, at the second node, an indication of actual or potential UL-DL interference generated by the first UE;

scheduling a second pair of UEs, that includes the second UE, for full-duplex UL-DL communication with the second node, the UEs of the second pair sending and receiving data in an uplink and downlink with the second node simultaneously, in which DL transmissions to the second UE from the second node use a second frequency resource different from the first frequency resource or in which scheduling is avoided for DL connections to the second UE that fall below a quality of service threshold determined using channel quality measurements obtained by the second UE for the first and second frequency resources.

2. The method as claimed in claim 1, further including transmitting an interference indicator message (IIM), from the first node to the second node including an indication of the first frequency resource to be used for uplink communication to the first node by the first UE.

3. The method as claimed in claim 1, wherein receiving the indication includes receiving data representing a report at the first full-duplex node from the first UE indicating a measure of a pilot power of the second node.

4. The method as claimed in claim 1, wherein receiving the indication includes receiving channel state information from UEs in connectivity with the second node, and using the channel state information to detect UL-DL interference between the first and second UEs.

5. The method as claimed in claim 1, further including using one or more of a set of multiple antenna elements of the first or second UEs to modify a directional transmission profile of the or each UE in order to form an UL transmission beam from the or each UE to its respective serving node.

6. The method as claimed in claim 1, wherein the pair of UEs is selected by determining a sum of the DL interference between respective ones of UEs in communication with the second node, and selecting a pair of UEs to be scheduled for which the sum of the DL interference is a minimum.

7. A full-duplex node in a heterogeneous telecommunications network, that provides downlink (DL) communications to a victim user equipment (UE) UE forming one of a pair of UEs in uplink-downlink (UL-DL) communication with the full-duplex node, the full-duplex node transmitting and receiving using shared frequency resources simultaneously so as to provide full-duplex communication for the pair of UEs, said full-duplex node comprising:

at least one processor and at least one memory including computer program code, wherein the at least one memory and the computer program code are configured to, with the at least one processor, cause the full-duplex node at least to:

receive an indication of UL-DL interference between the victim UE and an aggressor UE in uplink (UL) communication using a first frequency resource;

schedule the pair of UEs for UL-DL communication such that DL transmissions to the victim UE use a second frequency resource different from the first or avoid scheduling DL connections to the victim UE that fall below a quality of service threshold determined using channel quality measurements obtained from the victim UE for the first and second frequency resources.

8. The node as claimed in claim 7, wherein the node is further configured to receive an interference indicator message (IIM) that includes an indication of a first frequency resource to be used for the UL communication by the aggressor UE.

9. The node as claimed in claim 8, wherein the node receives the IIM from a second full-duplex node of the heterogeneous telecommunications network.

10. The node as claimed in claim 9, wherein the second full-duplex node receives data representing a report indicating a measure of a pilot power of the full-duplex node from the aggressor UE.

11. The node as claimed in claim 7, wherein the full-duplex node determines a sum of the DL interference between respective ones of UEs in communication with the full-duplex node, and selects a pair of UEs to be scheduled for which the sum of the DL interference is a minimum.

12. A full-duplex node in a heterogeneous telecommunications network, that serves uplink (UL) communications of an aggressor user equipment (UE) forming one of a pair of UEs in uplink-downlink (UL-DL) communication with the full-duplex node using a first frequency resource, the full-duplex node transmitting and receiving using shared frequency resources simultaneously so as to provide full-duplex communication for the pair of UEs, said full-duplex node comprising:

at least one processor and at least one memory including computer program code, wherein the at least one memory and the computer program code are configured to, with the at least one processor, cause the full-duplex node at least to provide, to a second full-duplex node which transmits and receives using shared frequency resources simultaneously so as to provide full-duplex communication for a pair of UEs, an indication of UL-DL interference between the aggressor UE and a victim UE in downlink (DL) communication with the second full-duplex node, whereby to enable the second full-duplex node to schedule a pair of UEs for UL-DL communication with the second full-duplex node such that DL transmissions to the victim UE use a second frequency resource different from the first or avoid scheduling DL connections to the victim UE that fall below a quality of service threshold determined using channel quality measurements obtained from the victim UE for the first and second frequency resources.

13. The full-duplex node as claimed in claim 12, wherein the full-duplex node determines a sum of the DL interference between respective ones of UEs in communication with the full-duplex node, and select a pair of UEs to be scheduled for which the sum of the DL interference is a minimum.

14. A computer program product, comprising a non-transitory computer usable medium having computer readable program code embodied therein, said computer readable program code adapted to be executed to implement a method to schedule, in a heterogeneous telecommunications network, downlink (DL) communication from a victim node which transmits and receives using shared frequency resources simultaneously so as to provide full-duplex communication for a pair of user equipments (UEs) to a victim UE that is one of a pair of UEs in uplink-downlink (UL-DL) communication with the victim node, in view of an aggressor UE in uplink (UL) communication with an aggressor node which transmits and receives using shared frequency resources simultaneously so as to provide full-duplex communication for a pair of UEs, by:

receiving an indication of actual or potential UL-DL interference between the victim UE and the aggressor UE at the victim node;

scheduling the pair of UEs such that the DL communication to the victim UE uses a second frequency resource different from the first or avoiding the scheduling of DL connections to the victim UE that fall below a quality of service threshold determined using channel quality measurements obtained from the victim UE for the first and second frequency resources.

15. The product as claimed in claim 14, further including program code embodied thereon to be executed to determine a sum of the DL interference between respective ones of UEs in communication with the node, and select a pair of UEs to be scheduled for which the sum of the DL interference is a minimum.

* * * * *